United States Patent
Tangudu et al.

(10) Patent No.: US 11,377,325 B2
(45) Date of Patent: Jul. 5, 2022

(54) LINEAR PROPULSION SYSTEM

(71) Applicant: Otis Elevator Company, Farmington, CT (US)

(72) Inventors: Jagadeesh Tangudu, Manchester, CT (US); William A. Veronesi, Hartford, CT (US); Enrico Manes, Feeding Hills, MA (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 388 days.

(21) Appl. No.: 16/545,313

(22) Filed: Aug. 20, 2019

(65) Prior Publication Data

US 2019/0375613 A1 Dec. 12, 2019

Related U.S. Application Data

(62) Division of application No. 15/100,740, filed as application No. PCT/US2013/073303 on Dec. 5, 2013, now Pat. No. 10,427,913.

(51) Int. Cl.
*B66B 11/04* (2006.01)
*B66B 17/12* (2006.01)
(Continued)

(52) U.S. Cl.
CPC .......... *B66B 11/0407* (2013.01); *B66B 17/12* (2013.01); *H02K 41/033* (2013.01); *B66B 9/003* (2013.01)

(58) Field of Classification Search
CPC ........................ B66B 11/0407; H02K 41/033
See application file for complete search history.

(56) References Cited

U.S. PATENT DOCUMENTS

| 3,937,431 A | 2/1976 | Guntner |
| 5,910,691 A | 6/1999 | Wavre |

(Continued)

FOREIGN PATENT DOCUMENTS

| CN | 1265078 A | 8/2000 |
| CN | 1409470 A | 4/2003 |

(Continued)

OTHER PUBLICATIONS

Machine translation CN 1409470.*

(Continued)

*Primary Examiner* — Diem M Tran
(74) *Attorney, Agent, or Firm* — Cantor Colburn LLP

(57) ABSTRACT

A linear propulsion machine and system (10) is disclosed that includes a stator (30) having a plurality of teeth (34) and a mover (32) moveable in a linear direction along the stator (30). The mover may include a plurality of spaced apart ferromagnetic strata (40), a plurality of slots (42), a plurality of wire coils (44), and a plurality of magnet layers (46). Each of the slots (42) may be adjacent to at least one of the strata (40). Each coil (44) may be disposed in a slot (42). Each magnet layer (46) may be sandwiched between strata (40) and disposed inside one of the plurality of coils (44). Each coil (44) is disposed perpendicularly to the direction of magnetic flux of the magnet layer (46) around which the coil (44) is wound. In an embodiment, the teeth (34) or the magnet layer (46) may be disposed at an angle.

9 Claims, 15 Drawing Sheets

(51) Int. Cl.
*H02K 41/03* (2006.01)
*B66B 9/00* (2006.01)

(56) References Cited

U.S. PATENT DOCUMENTS

| | | | |
|---|---|---|---|
| 6,189,657 | B1 | 2/2001 | Jessenberger |
| 6,305,501 | B1 | 10/2001 | Kahkipuro et al. |
| 6,513,627 | B1 | 2/2003 | Cruise et al. |
| 7,261,186 | B2 | 8/2007 | Deplazes |
| 9,150,116 | B2 | 10/2015 | Matscheko et al. |
| 2007/0199770 | A1 | 8/2007 | Kocher |
| 2009/0206681 | A1 | 8/2009 | Jajtic |
| 2010/0253169 | A1 | 10/2010 | El-Rafaie et al. |
| 2010/0301684 | A1 | 12/2010 | Matscheko et al. |
| 2016/0297647 | A1 | 10/2016 | Tangudu et al. |

FOREIGN PATENT DOCUMENTS

| | | | | |
|---|---|---|---|---|
| CN | 2873722 | Y | 2/2007 | |
| CN | 101741214 | A | 6/2010 | |
| CN | 102153008 | A | 8/2011 | |
| CN | 202704767 | U | 1/2013 | |
| EP | 2242167 | A2 | 10/2010 | |
| EP | 3521232 | A1 * | 8/2019 | ............... B66B 1/30 |
| JP | H09272677 | A | 10/1997 | |
| JP | 2002112527 | A | 4/2002 | |
| JP | 2013176299 | A | 9/2013 | |
| WO | 0014006 | A1 | 9/1999 | |
| WO | 03064310 | A1 | 8/2003 | |
| WO | WO-2013122031 | A1 * | 8/2013 | ........... H02K 41/031 |
| WO | WO-2014148434 | A1 * | 9/2014 | ............. H02K 41/02 |
| WO | WO-2016159034 | A1 * | 10/2016 | ........... H02K 41/033 |

OTHER PUBLICATIONS

Machine translation WO2014/148434.*
Chinese Office Action and Search Report for application CN 201380082033.9, dated Jul. 13, 2017, 4pgs.
European Search Report for application EP 13898526.2, dated Nov. 6, 2017, 8 pages.
International Search Report for application PCT/US2013/073303, dated Sep. 1, 2014, 9 pages.
Non Final Office Action for U.S. Appl. No. 15/100,740, dated Jan. 25, 2019, 17 pages.
Notice of Allowance for U.S. Appl. No. 15/100,740, dated May 17, 2019, 12 pages.
Restriction Requirement for U.S. Appl. No. 15/100,740, dated Sep. 11, 2018, 8 pages.

* cited by examiner

LINEAR PROPULSION SYSTEM

CROSS-REFERENCE TO RELATED APPLICATION

This application is a divisional of U.S. patent application Ser. No. 15/100,740 filed Jun. 1, 2016, which is a U.S. national stage of Patent Application no. PCT/US2013/073303 filed Dec. 5, 2013, all of which are incorporated herein by reference in its entirety.

FIELD OF THE DISCLOSURE

The present disclosure generally relates to linear propulsion system, and, in particular, relates to self-propelled elevator systems.

BACKGROUND OF THE DISCLOSURE

Self-propelled elevator systems, also referred to as rope-less elevator systems are envisioned as useful in various applications (i.e., high rise buildings) where the mass of the ropes for a roped system is awkward and there is a desire for multiple elevator cars in a single hoistway. There exist self-propelled elevator systems in which a first hoistway is designated for upward traveling elevator cars and a second hoistway is designated for downward traveling elevator cars. A transfer station at each end of the hoistway is used to move cars horizontally between the first hoistway and the second hoistway.

A cost effective elevator system is desired.

SUMMARY OF THE DISCLOSURE

In accordance with one aspect of the disclosure, a linear propulsion machine is disclosed. The linear propulsion machine may comprise a first stator and a first mover. The stator may include a plurality of teeth. The first mover may be adjacent to the first stator and moveable in a linear direction along the first stator. The mover may include a plurality of spaced apart ferromagnetic strata, a plurality of slots, each of the slots adjacent to at least one of the strata, a plurality of wire coils, and a plurality of magnet layers. Each magnet layer may be sandwiched between two of the strata and disposed inside one of the plurality of coils. Each coil may be disposed in at least one slot, and the coils may have an activated state and a deactivated state. Each coil may be disposed substantially perpendicularly to the direction of magnetic flux of the permanent magnet layer around which the coil is wound. The teeth or the permanent magnet layer may be disposed at an angle from a plane substantially perpendicular to the direction of thrust on the first mover generated by the interaction of the first mover with the first stator.

In a refinement, the plurality of slots may be a multiple of a number of phases of the linear propulsion machine.

In another refinement, each of the plurality of teeth may include a skewed side surface.

In yet another refinement, each of the plurality of teeth has a tooth width and a distance across the slot between two strata is a slot width, wherein the slot width is about the same as the tooth width.

In another refinement, each of the strata may include a skewed strata side surface.

In another refinement, the linear propulsion machine may further include a second stator. The first mover may be disposed between the first and second stators.

In another refinement, the linear propulsion machine may further include a second mover moveable in a linear direction along the first stator. The first stator may be disposed between the first and second movers. In a further refinement, the magnet layers of each of the first and second movers may be angled in relation to the first stator. In another refinement, the linear propulsion machine may further include a third and fourth mover moveable in a linear direction along the first stator. The first stator may be disposed between the third and forth movers and the third and fourth movers may be offset from the first and second movers.

In accordance with another aspect of the disclosure, another linear propulsion machine is disclosed. The linear propulsion machine may comprise a first stator, and a first mover. The stator may include a plurality of teeth, each of the teeth having a magnetic pole. The first mover may be adjacent to the first stator and moveable in a linear direction along the first stator. The teeth of the first stator and the first mover may define a gap. The mover may include a plurality of spaced apart ferromagnetic strata, a plurality of slots, a plurality of wire coils, and a plurality of permanent magnet layers.

Each permanent magnet layer may be sandwiched between two of the strata and disposed inside one of the plurality of coils. Each of the slots may be adjacent to at least one of the strata. Each coil may be disposed in at least one slot. The coils may have an activated state and a deactivated state. The plurality of permanent magnet layers may be mounted on the mover to have reversed polarities with consecutive permanent magnet layers in a longitudinal direction along the mover. Each coil may be disposed substantially perpendicularly to the direction of magnetic flux of the permanent magnet layer around which the coil is wound. The teeth or the permanent magnet layer may be disposed at an angle in the range of about −60° to about 60° from a plane substantially perpendicular to the direction of thrust on the first mover generated by the interaction of the first mover with the first stator.

In a refinement, each permanent magnet layer may have a trapezoidal shape.

In another refinement, each permanent magnet layer may be comprised of first and second permanent magnets. The first permanent magnet may be disposed between the stator and the second magnet. The first permanent magnet may be a bonded magnet.

In accordance with yet another aspect of the disclosure, an elevator system is disclosed. The elevator system may comprise a hoistway, a car disposed within the hoistway, and a linear motor. The linear motor may include a first stator disposed in the hoistway and including a plurality of teeth, and a first mover mounted on the car and adjacent to the stator. Each of the teeth of the first stator may be a magnetic pole. The first stator may be made of laminated ferromagnetic material. The first mover may be moveable in a linear direction along the first stator. The mover may include a plurality of spaced apart strata made of laminated ferromagnetic material, a plurality of slots, a plurality of permanent magnet layers, and a plurality of wire coils. Each of the slots may be adjacent to at least one of the strata. Each permanent magnet layer may be sandwiched between two of the strata. Each permanent magnet layer may be comprised of a first magnet and a second magnet. The first magnet may be disposed between the second magnet and the stator. The first magnet may be a bonded magnet. The second magnet may be a sintered magnet. The coils may have an activated state and a deactivated state. Each coil may be disposed in at least one slot and wound around one of the permanent magnets.

Each coil may be disposed substantially perpendicularly to the direction of magnetic flux of the permanent magnet around which the coil is wound. The linear motor may be a polyphase motor. A first group of the plurality of wire coils may carry alternating current with a different phase than a second group of the plurality of wire coils.

In a refinement, the teeth may be disposed at an angle in the range of about −60° to about 60° from a plane perpendicular to the direction of thrust on the first mover generated by the interaction of the first mover with the first stator.

In another refinement, the permanent magnet layers may be disposed at an angle in the range of about −60° to about 60° from a plane perpendicular to the direction of thrust on the first mover generated by the interaction of the first mover with the first stator.

In another refinement, the plurality of teeth may be one greater than the plurality of slots.

In another refinement, the elevator system may further include a second stator. The first mover may be disposed between the first and second stators.

In another refinement, the elevator system may further include a second mover mounted to the car and moveable in a linear direction along the first stator. The first stator may be disposed between the first and second movers. In a further refinement, the teeth of the first and second movers may be disposed at an angle in the range of about −60° to about 60° from a plane perpendicular to the direction of thrust on the first mover generated by the interaction of the first mover with the first stator.

In another refinement, the elevator system may further include a third and fourth mover mounted to the car and moveable in a linear direction along the first stator. The first stator may be disposed between the third and forth movers and the third and fourth movers may be offset from the first and second movers. The offset may be a distance in the range of more than zero to about one per unit stator channel pitch.

These and other aspects of this disclosure will become more readily apparent upon reading the following detailed description when taken in conjunction with the accompanying drawings.

Figure 1:
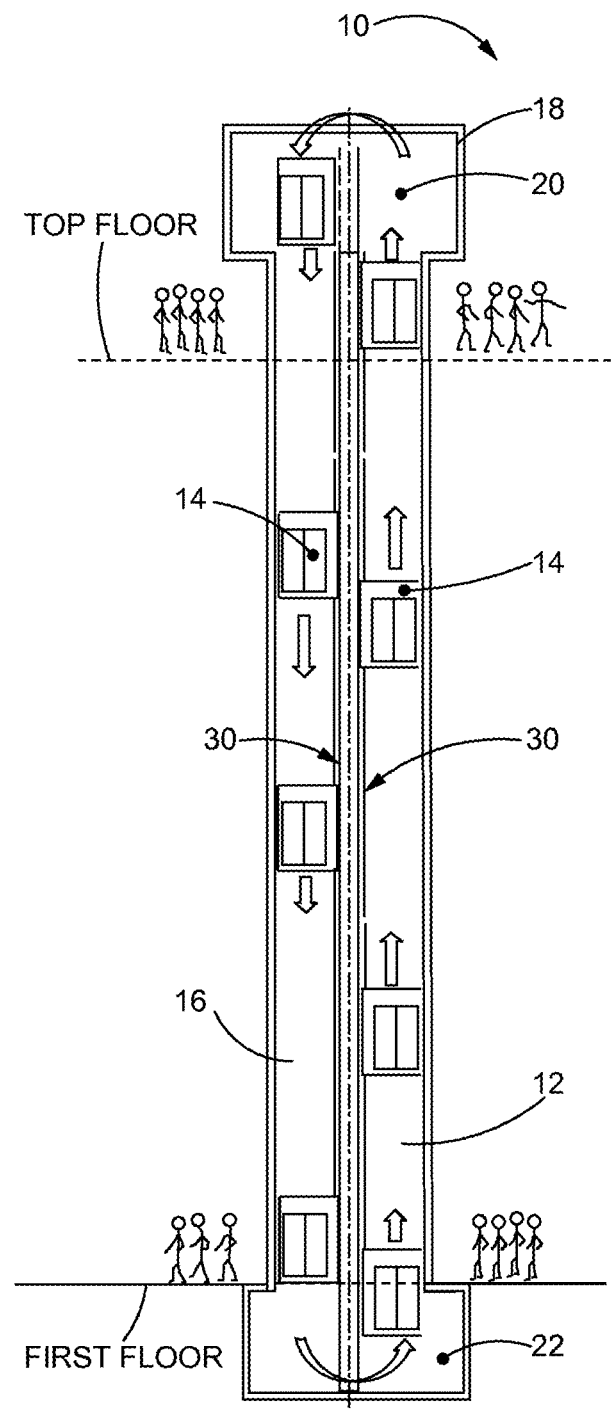
FIG. 1 is an embodiment of an exemplary elevator system.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling within the spirit and scope of the present disclosure.

DETAILED DESCRIPTION OF THE DISCLOSURE

The linear propulsion system 10 disclosed herein may be utilized in applications that require movement of a vehicle along a track. For example, the linear propulsion system may be utilized for elevators, trains, roller coasters, or the like.

To facilitate the understanding of this disclosure, the linear propulsion system will be described as utilized in a linear motor propelled elevator system. It is to be understood that the linear propulsion system is not intended to be limited to elevator applications. The elevator application described herein is an exemplary embodiment described in order to facilitate understanding of the disclosed propulsion system.

Referring now to FIG. 1, a propulsion system 10 is shown in schematic fashion. The propulsion system is an exemplary elevator system that utilizes one or more linear motors. As shown in FIG. 1, the elevator system 10 comprises a hoistway 18 that includes a first hoistway portion 12 and a second hoistway portion 16. The first and second hoistway portions 12, 16 may each be disposed vertically within a multi-story building. The first and second hoistway portions 12, 16 may be dedicated to directional travel. In some embodiments, the first and second hoistway portions 12, 16 may be part of a single open hoistway 18. In other embodiments, the first and second hoistway portions 12, 16 may be part of a divided hoistway 18 that has a wall or other divider between the first and second hoistway portions 12, 16. The hoistway 18 is not limited to two hoistway portions. In some embodiments, the hoistway 18 may include more than two hoistway portions disposed vertically within a multi-story building.

In the embodiment illustrated in FIG. 1, elevator cars 14 may travel upward in the first hoistway portion 12. Elevator cars 14 may travel downward in the second hoistway portion 16. Elevator system 10 transports elevator cars 14 from a first floor to a top floor in the first hoistway 12 and transports elevator cars 14 from the top floor to the first floor in the second hoistway 16. Above the top floor is an upper transfer station 20 where elevator cars 14 from the first hoistway 12 are moved to the second hoistway 16. It is understood that the upper transfer station 20 may be located at the top floor, rather than above the top floor. Below the first floor is a lower transfer station 22 where elevator cars 14 from the second hoistway 16 are moved to the first hoistway 12. It is understood that lower transfer station 22 may be located at the first floor, rather than below the first floor. Although not shown in FIG. 1, elevator cars 14 may stop at intermediate floors to allow ingress to and egress from an elevator car 14.

Figure 2:
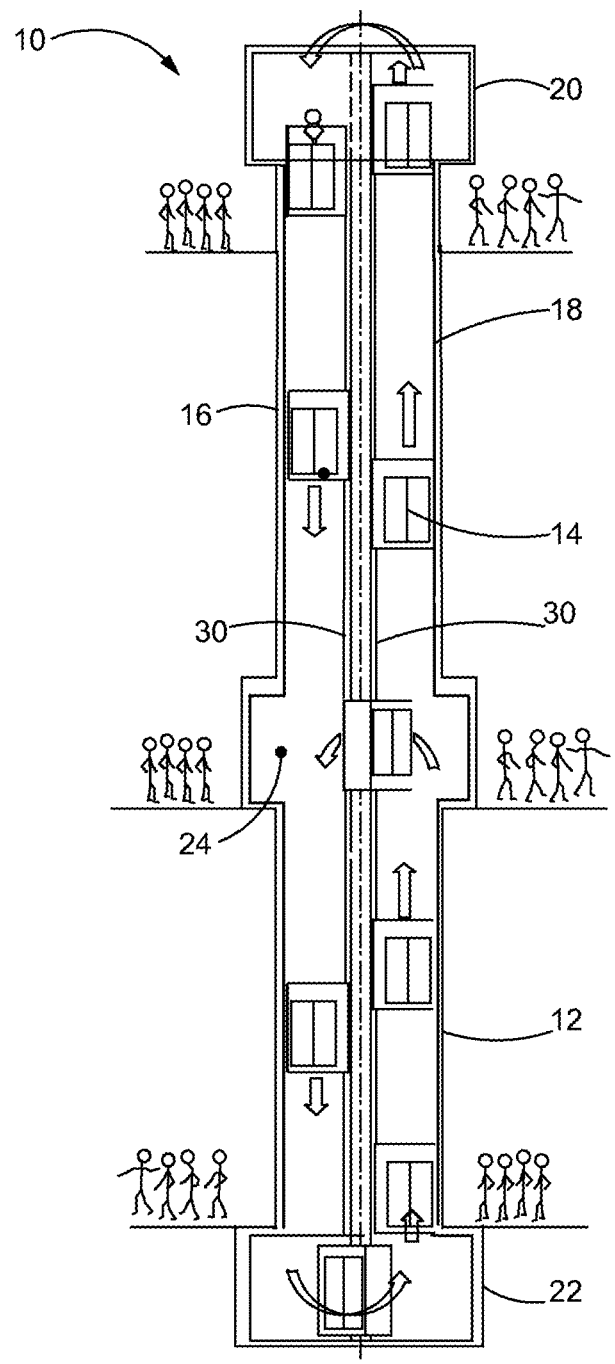
FIG. 2 is an another embodiment of an exemplary elevator system.

FIG. 2 depicts another exemplary embodiment of the elevator system 10. In this embodiment, the elevator system 10 includes an intermediate transfer station 24 located between the first floor and the top floor where the elevator car 14 may be moved from the first hoistway portion 12 to the second hoistway portion 16 and vice versa. Although a single intermediate transfer station 24 is shown, it is understood that more than one intermediate transfer station 24 may be used. Such an intermediate transfer may be utilized to accommodate elevator calls. For example, one or more passengers may be waiting for a downward traveling car 14 at a landing on a floor. If no cars 14 are available, an elevator car 14 may be moved from the first hoistway portion 12 to the second hoistway portion 16 at intermediate transfer station 24 and then moved to the appropriate floor to allow the passenger(s) to board. It is noted that elevator cars may be empty prior to transferring from one hoistway to another at any of the upper transfer station 20, lower transfer station 22, or intermediate transfer station 24. The elevator system 10 includes one or more stators 30 disposed within each hoistway portion 12, 16. The stator 30 generally extends the length of the hoistway portion 12, 16 and may be mounted on a support frame, a wall of the hoistway 18, or the like. The elevator system 10 further includes one or more movers mounted to each car 14.

Figure 3:
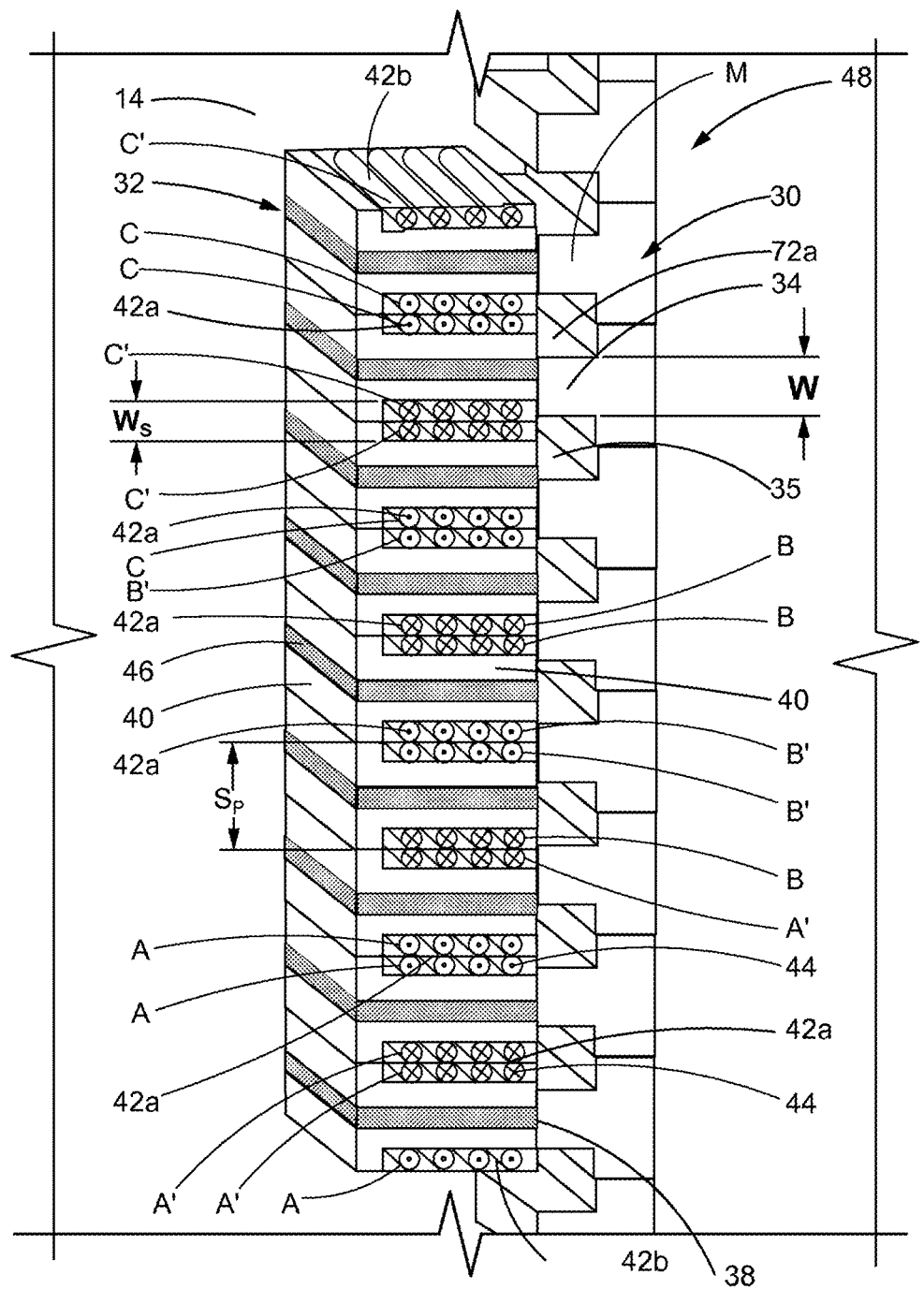
FIG. 3 is a perspective view of one exemplary embodiment of a linear motor for an elevator system constructed in accordance with the teachings of this disclosure.

Turning now to FIG. 3, therein is shown one exemplary arrangement of a first stator 30 disposed within a hoistway portion 12, 16 and a first mover 32 mounted to a car 14. The stator 30 may include a plurality of teeth 34 and is made of ferromagnetic material. For example, in one embodiment, the stator 30 may be made of silicone steel, or the like. In some embodiments, the stator 30 may also be a laminated material. In between each of the teeth 34 is a channel 35. Typically, the quantity of channels 35 is an even number.

Each of the plurality of teeth 34 has a tooth width W. Further, each of the teeth 34 of the stator 30, when adjacent to the mover 32, may be a magnetic pole M. For example, in FIG. 3 the stator 30 has eight (8) poles Mover the length of the first mover 32. The number of poles M of the stator is different than the number of slots 42 of the mover (slots 42 are discussed in more detail later) over the length of the mover. For example, the number of poles M may be one (1) greater or less than the number of slots 42, two (2) greater or less than the number of slots 42, three (3) greater or less than the number of slots 42, etc. In general, the closer the number of slots 42 of the mover is to the number of poles M of the stator (over the length of the mover), the better the performance of the linear motor.

The mover 32 is adjacent to the stator 30 and is moveable in a linear direction along the stator 30. The teeth 34 of the stator 30 and the mover 32 define a gap 38. In some embodiments, the gap 38 may be an air gap. The mover 32 may include a plurality of spaced apart strata 40, a plurality of slots 42, a plurality of wire coils 44, and a plurality of permanent magnet layers 46.

Each strata 40 may each be made of ferromagnetic material. In some embodiments, each strata 40 may be made of laminated ferromagnetic material. In some embodiments, each strata 40 may be generally L-shaped such that two consecutive strata may form a U-shape pair. The strata 40 are not limited to this shape and may be other shapes as well.

Each slot 42 is adjacent to at least one of the strata 40. In linear embodiments, the slots 42 may be grouped as internal full slots 42a and external half slots 42b. The internal slots 42a are disposed between two strata 40. The external half slots 42b are adjacent to one strata 40. Typically the external half slots 42b are the first and the last slots 42 on a mover 32. The distance across a slot 42 between two strata 40 is a slot width Ws. In one embodiment, the slot width Ws may be about the same as the tooth width W. In other embodiments, the slot width Ws may be different than the tooth width W. Two of the external half slots 42b are equivalent to one full slot 42a. The mover slot pitch Sp is the distance between the midpoint of a first slot 42 and the midpoint of the next adjacent slot 42.

In one embodiment, the plurality of slots 42 is a multiple of the number of phases of the linear propulsion machine or linear motor 48 that comprises at least one mover 32 and at least one stator 30. More specifically, the quantity of slots 42 is a multiple of the number of phases P of the linear motor 48 in order to achieve a balanced winding and may be defined by the equation: quantity of slots=k*P where k is an integer. For example, in the embodiment of FIG. 3, the linear motor is a three-phase machine. The value of P is three (3), the value of k is three (3) and the resulting number of slots is equivalent to nine (9) full slots (eight full slots 42a plus two half-slots 42b).

Each wire coil 44 is disposed in at least one slot 42. Each coil 44 is wound around, or encircles, the combination of magnet layer 46 and the at least two strata 40 that sandwich the magnet layer 46. As can be seen in FIG. 3, two separate coils 40 are wound through, or disposed in, each internal slot 42a.

The coils 42 may be operably connected to a source of electrical current (not shown). The source may provide multi-phase current as is known in the art. For example, the linear motor illustrated in FIG. 3 is a three-phase machine that can receive the three alternating currents A, B, C of a three-phase electrical source. In such a three-phase system, three groups of coils 42 (A, B, C) each carry one of the three alternating currents of the same frequency which reach their peak values at one third of a cycle from each other. As illustrated in FIG. 3, the coils 42A and 42A' carry the A phase, the coils 42B and 42B' carry the B phase, and the coils 42C and 42C' carry the C phase. Current direction into the page is indicated by A', B' and C'. Current direction out of the page is indicated by A, B, C.

Each coil 44 may be made of a conductive material such as copper, aluminum, a combination of the two, or the like. Each coil 44 has an activated state and a deactivated state. When activated, current is flowing in the coil 44. Each coil 44 disposed, in relation to the magnet layer 46, perpendicular to the direction of magnetic flux of the magnet layer 46 around which the coil 44 is wound. This orientation ensures that the current in the coil 44 is also perpendicular to the magnetic flux.

Each magnet layer 46 is sandwiched between two of the strata 40 and disposed inside one of the plurality of coils 44. Each magnet layer 46 may be a permanent magnet or an electromagnet. The plurality of magnet layers 46 are mounted on the mover 32 to have reversed polarities with consecutive magnet layers 46 in a longitudinal direction along the mover 32.

In operation, the interaction of the activated coils 44 of the mover 32 with the stator 30 produces a thrust on the mover 32 attached to the car 14 and propels the car 14 along the stator 30. While, the combination of stator 30 with the mover 32 is described in conjunction with use as a motor 48, it may also be used as a generator during regeneration.

Figure 4:
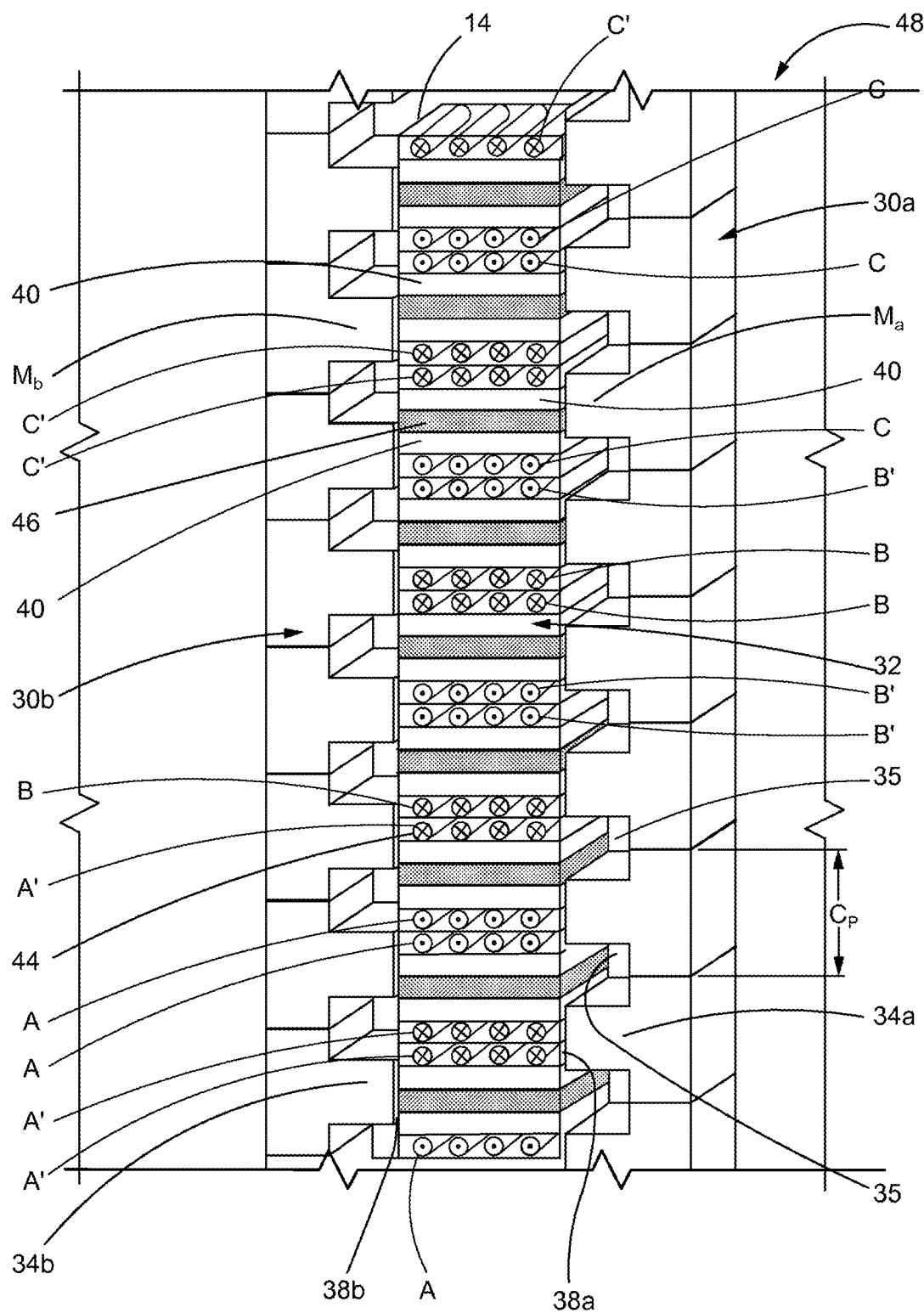
FIG. 4 is a perspective view of another exemplary embodiment of a linear motor.

Turning now to FIG. 4, therein is illustrated another embodiment of a motor 48. Elements of FIG. 4 that correspond to elements in FIG. 3 are labeled with the same reference numerals where practicable. In the embodiment of FIG. 4 the elevator system 10 includes a first stator 30a, a second stator 30b and a mover 32 disposed between the first and second stators 30a, 30b. The stators 30a, 30b are similar to that discussed with reference to the embodiment of FIG. 3 except that, in order to facilitate flow of flux between the mover 32 and each of the stators 30a, 30b, each of the strata 40 are not L-shaped as they were in the embodiment illustrated in FIG. 3. The teeth 34a of the first stator 30a and the mover 32 define a first gap 38a, and the teeth 34b of the second stator 30b and the mover 32 define another gap 38b. As in the previous embodiment illustrated in FIG. 3, each gap 38a, 38b may be an air gap. Further, each of the teeth 34a, 34b of the each stator 30a, 30b may be a magnetic pole Ma, Mb. To achieve better performance, the teeth 34a of the first stator 30a may be offset (vertically) from the teeth 34b of the second stator 30b. In one embodiment, the offset may be in the range of greater than zero to about one stator channel pitch Cp. The channel pitch Cp is defined as the distance from the midpoint of a first channel 35 to the mid-point of a second adjacent channel 35. The offset is beneficial to the production of useful force/torque. Maximum thrust force may be generated when each of the teeth of one stator is offset from the teeth of the other opposing stator by half of a stator channel pitch Cp.

Figure 5:
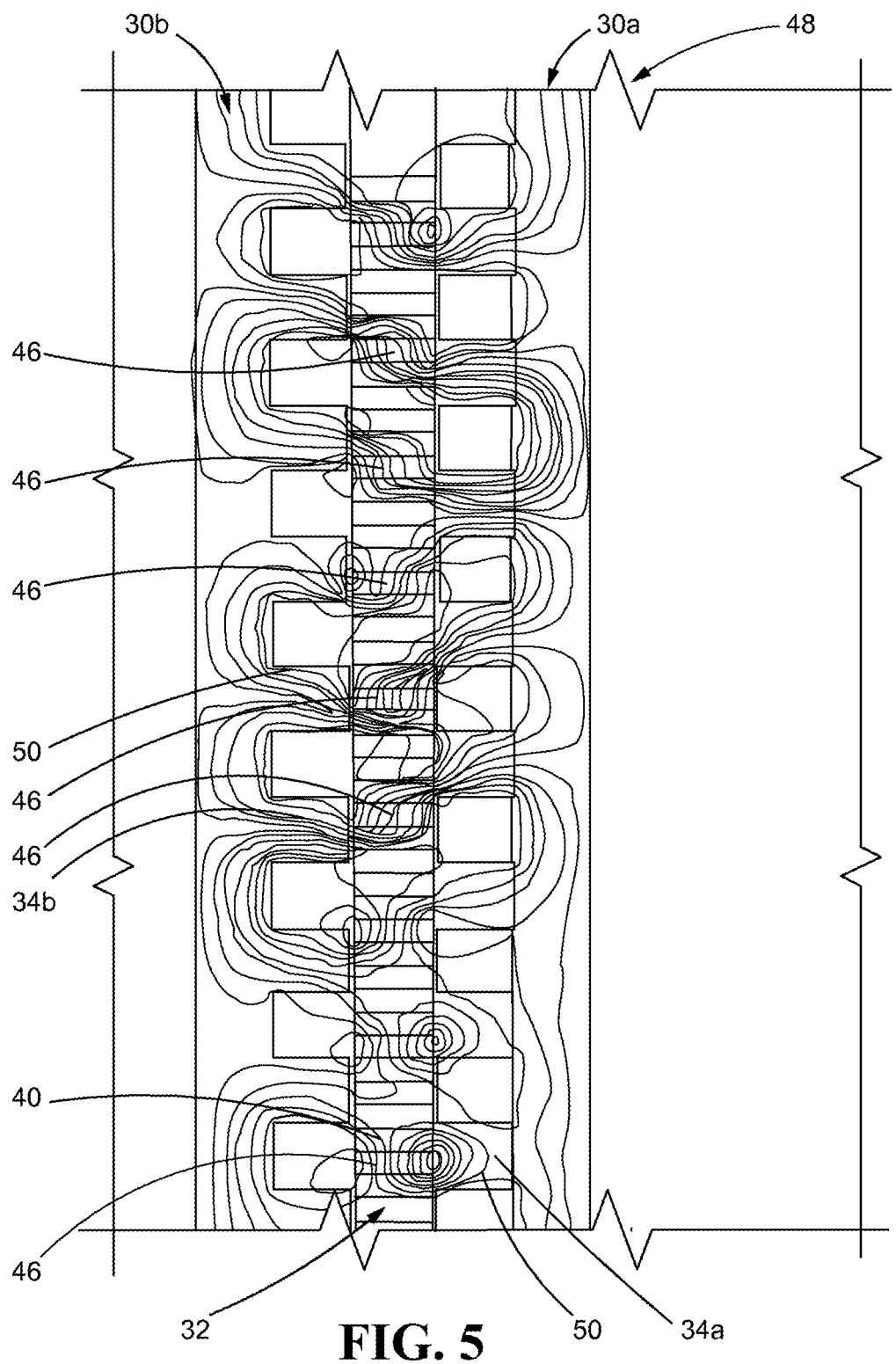
FIG. 5 is a schematic front view of the linear motor of FIG. 4 with the lines of magnetic flux illustrated.

Turning to FIG. 5, therein is schematically illustrated the lines of magnetic flux of the exemplary embodiment illustrated in FIG. 4 when the coils are excited by a current load. As can been seen the lines of magnetic flux 50 flow from one of the poles of the magnet layer 46, in this embodiment a permanent magnetic layer, to the stator teeth 34 and back to the magnet layer 46. In FIG. 5, the coils have been removed from the illustration so as not to obscure the magnetic lines of flux 50 in the illustration.

Figure 6:
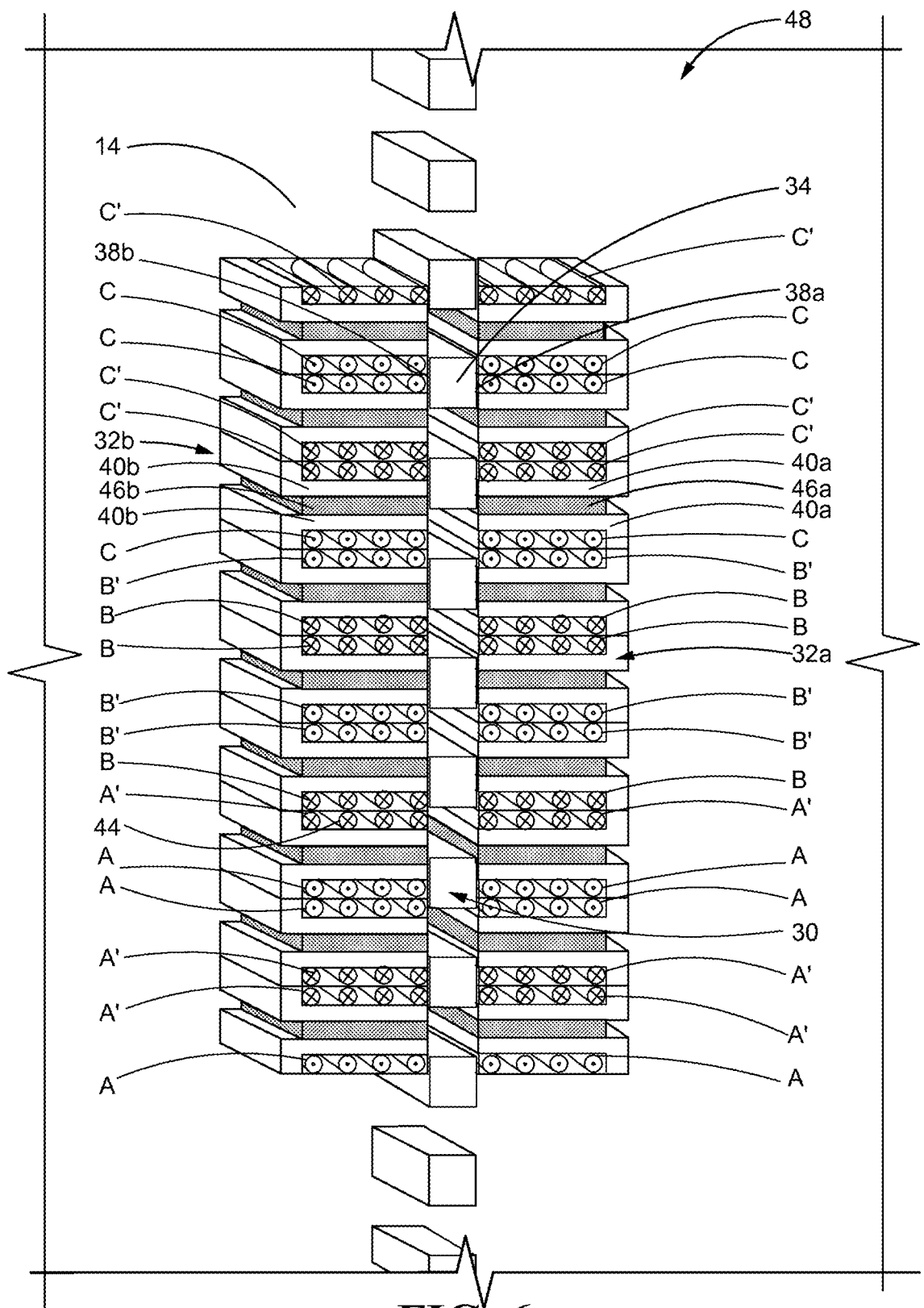
FIG. 6 is a perspective view of another exemplary embodiment of a linear motor.

Turning now to FIG. 6, therein is illustrated an embodiment of the linear motor 48 for use in the elevator system 10. Elements of FIG. 6 that correspond to elements in FIG. 3 are labeled with the same reference numerals where practicable. In the embodiment of FIG. 6, the linear motor 48 of the elevator system 10 includes a stator 30 disposed between two movers 32, namely a first mover 32a and a second mover 32b.

Both of the movers 32a, 32b are mounted to a car 14. The first mover 32a and the teeth 34 of the stator 30 define a first gap 38a as does the second mover 32b and the teeth 34 of the stator 30. This arrangement includes double the magnets of the embodiment shown in FIG. 3 and thus provides a higher power density and force on the movers 32a, 32b relative to the other embodiment.

Figure 7:
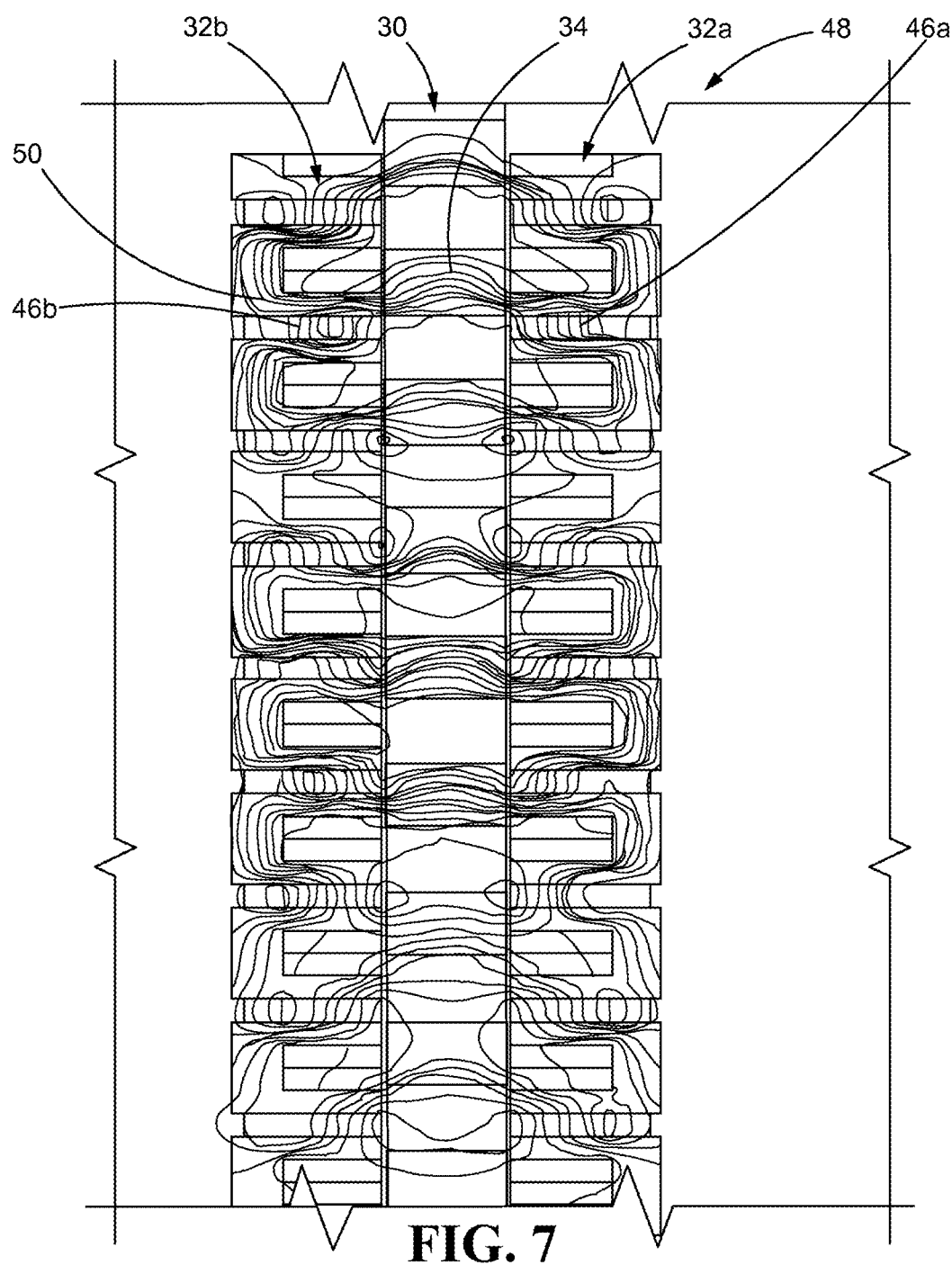
FIG. 7 is a schematic front view of the linear motor of FIG. 6 with the lines of magnetic flux illustrated.

Turning to FIG. 7, therein is schematically illustrated the lines of magnetic flux of the exemplary embodiment illustrated in FIG. 6 when the coils are excited by a current load. As can been seen the lines of magnetic flux 50 that flow from the poles of the magnet layers 46, in this embodiment a permanent magnetic layer, to the stator teeth 34 and back to the magnet layers 46 are combined for the two movers 32a, 32b, which generates a greater thrust or force on the movers 32a, 32b than in embodiments having only one mover 32. In FIG. 7, the coils have been removed from the illustration so as not to obscure the magnetic lines of flux 50 in the illustration.

Figure 8:
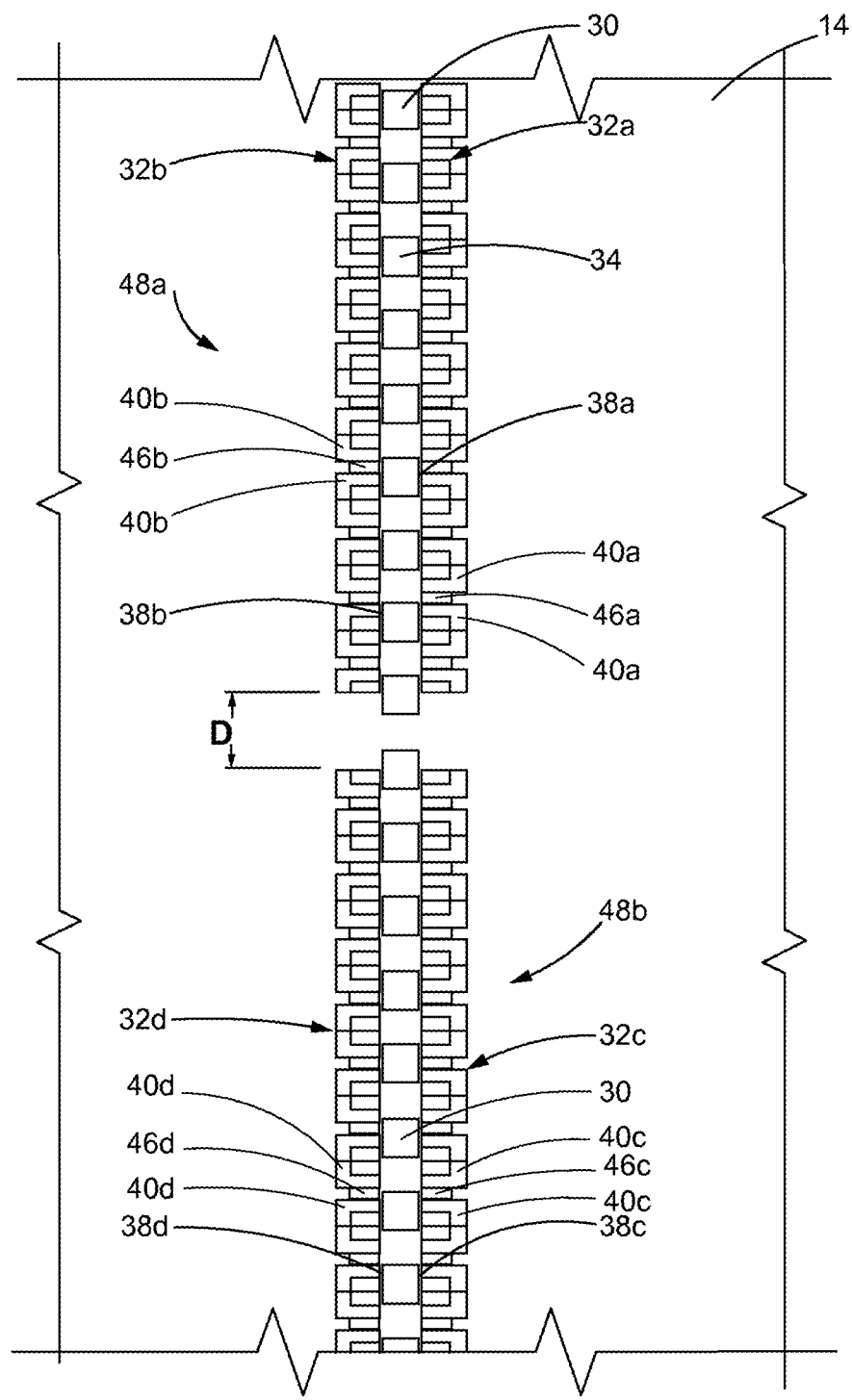
FIG. 8 is an alternative embodiment with two linear motors mounted on an exemplary car.

Turning now to FIG. 8, therein is illustrated an alternative embodiment in which the elevator system 10 includes two of the linear motors of FIG. 6. More specifically, the elevator system 10 of FIG. 8 includes first, second, third and fourth movers 32a, 32b, 32c, 32d mounted to a car 14. Similar to the embodiment of FIG. 6, the stator 30 is disposed between the first and second movers 32a, 32b. In FIG. 8, the stator 30 is also disposed between the third and fourth movers 32c, 32d. Elements of FIG. 8 that correspond to elements in FIG. 3 are labeled with the same reference numerals where practicable.

Each of the third and fourth movers 32c, 32d is offset a distance D from the first and second movers 32a, 32b. This offset reduces the thrust force ripple to provide a better quality ride in the car 14 for passengers. Thrust force ripple may occur due to variation in stator 30 permeance experienced by the movers 32a, 32b, 32c, 32d as they traverse the stator 30. Reduction in thrust force ripple can be achieved by adjusting the position of the movers 32a, 32b of the first linear motor 48a relative to the movers 32c, 32d of the second linear motor 48b so that the instantaneous thrust force ripple generated by each is cancelled while the average thrust force is maintained constant. This reduces vibrations and improves ride quality. The distance D may be in the range of greater than zero to about one per unit stator channel pitch Cp.

Figure 9:
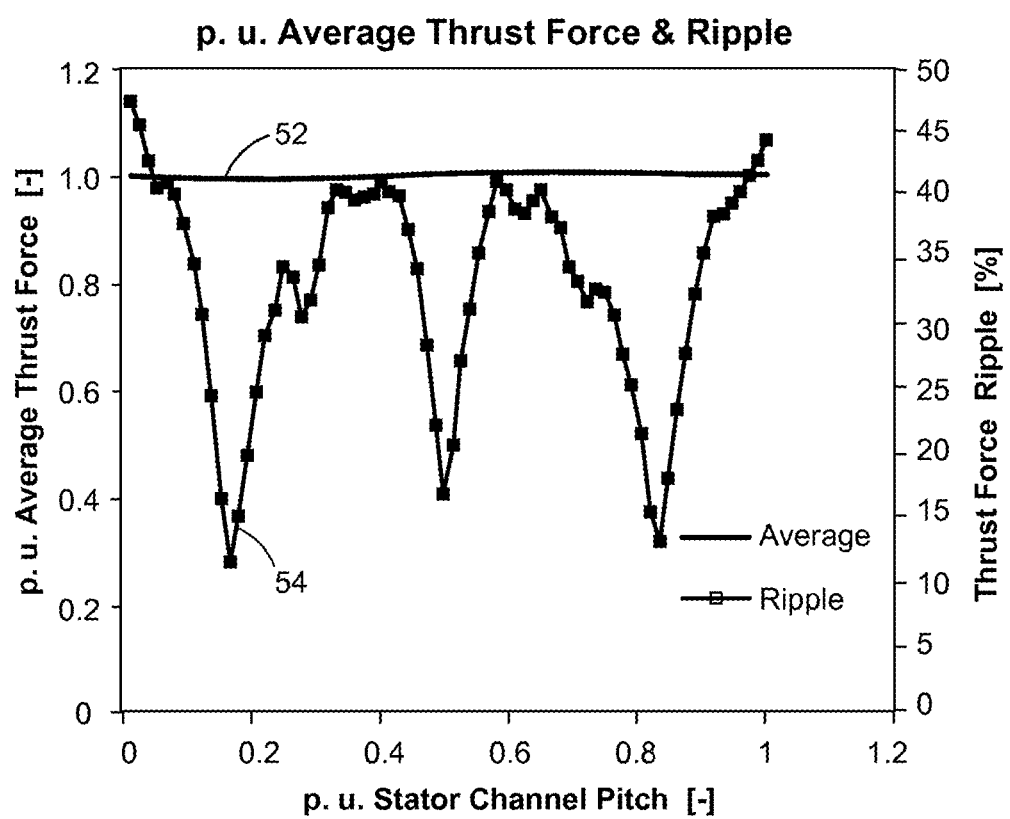
FIG. 9 is a graph of the average thrust force and percentage thrust force ripple as a function of offset between the two linear motors of FIG. 8.

FIG. 9 illustrates the average thrust force 52 and percentage thrust force ripple 54 as a function of offset between the two linear motors 48a, 48b of FIG. 8. The offset has been unitized in terms of stator channel pitch. It can be seen that there are three different offset distances, in this exemplary embodiment, that result in thrust force ripple being reduced from about 48% to about 12%. This is achieved by generating an instantaneous thrust force of linear motor 48b (FIG. 8) that is out of phase to that of linear motor 48a. In the exemplary embodiment illustrated in FIG. 9, the ranges of per unit stator channel pitch Cp that provided lower thrust force ripple were as follows: about 0.14 to about 0.17 per unit stator channel pitch Cp; about 0.47 to about 0.53 per unit stator channel pitch Cp; and about 0.80 to about 0.86 per unit stator channel pitch Cp.

Figure 10:
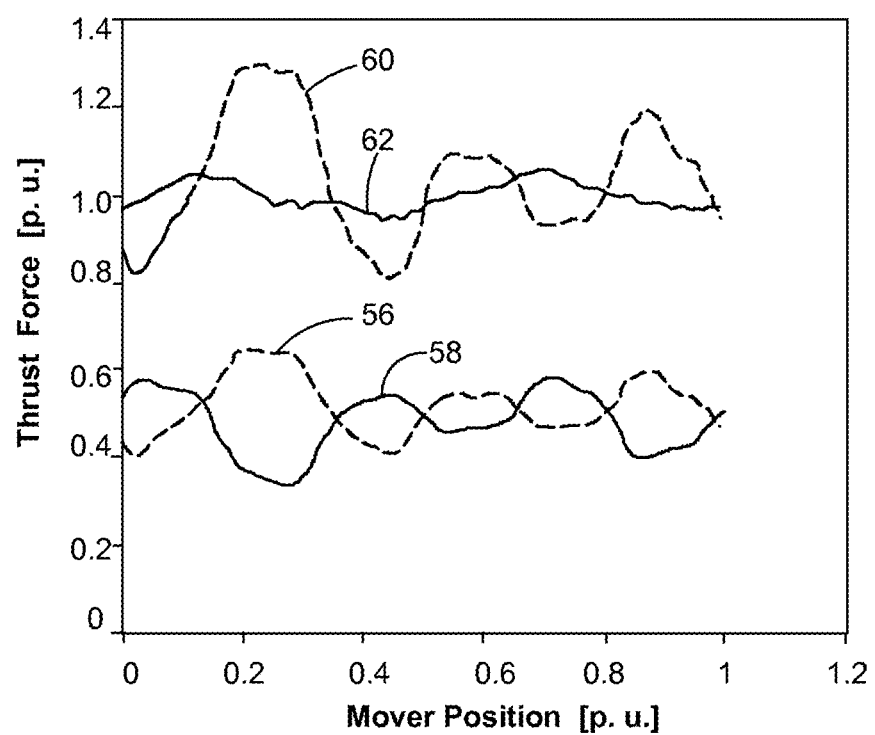
FIG. 10 is a graph of the thrust force as a function of linear motor offset for the two linear motors of FIG. 8.

FIG. 10 illustrates the thrust force as a function of linear motor offset. Line 56 illustrates the machine force per unit for linear machine 48a, line 58 illustrates the machine force per unit for linear machine 48b, line 60 illustrates the total force generated by the two linear motors 48a, 48b without offset, and line 62 illustrates the total force generated by the two linear motors with offset.

Figure 11:
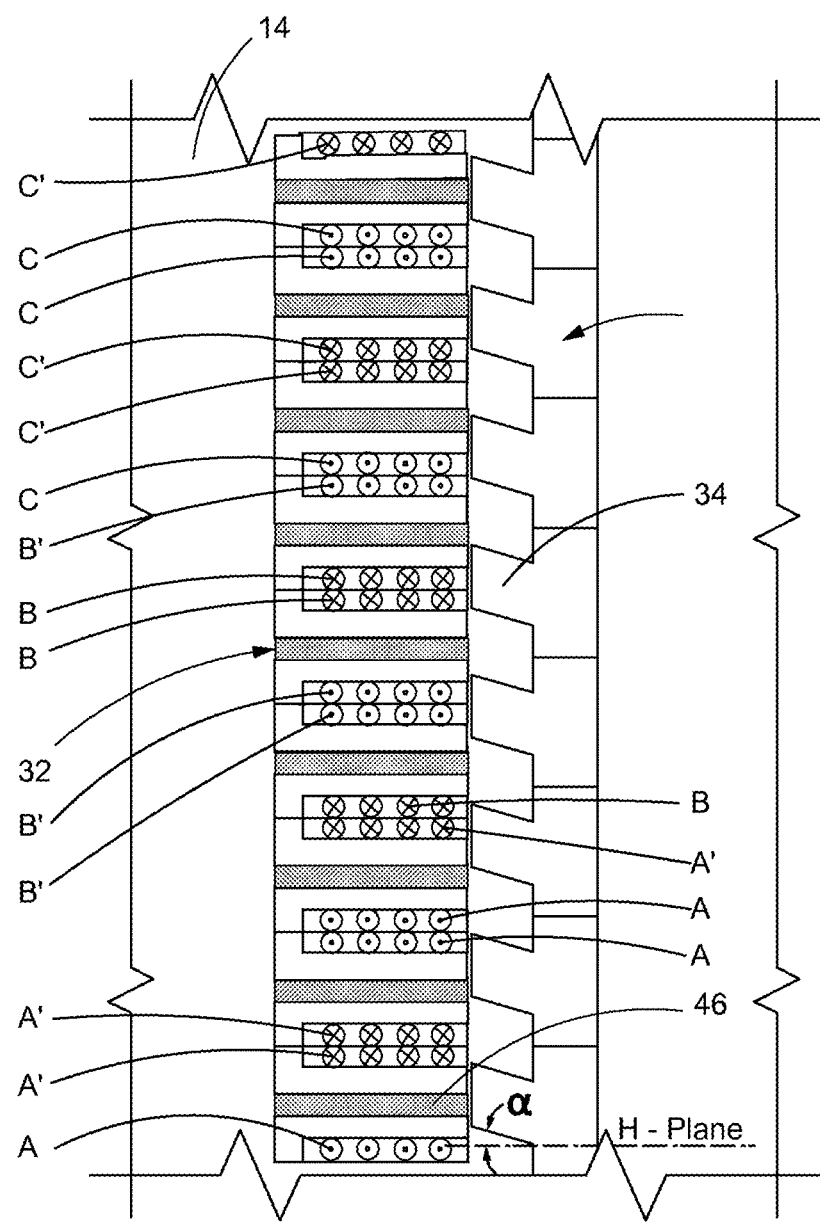
FIG. 11 is a front view of the exemplary linear motor of FIG. 3 with the stator teeth angled.

FIG. 11 illustrates a variation in which the teeth 34 of the stator 30 may be angled. Although shown with regard to the embodiment of FIG. 3, this variation is applicable to each of the aforementioned embodiments in FIGS. 3-4, 6 and 8. The term "angled" as used herein means rotated an angle from a plane H perpendicular to the direction of thrust on the mover 32 generated by the interaction of the mover 32 with the stator 30. The angle for the stator 30 teeth 34 is the angle a and may be in the range of about −60° to about 60° from the plane H perpendicular to the direction of thrust on the mover 32 generated by the interaction of the mover 32 with the stator 30.

Figure 12:
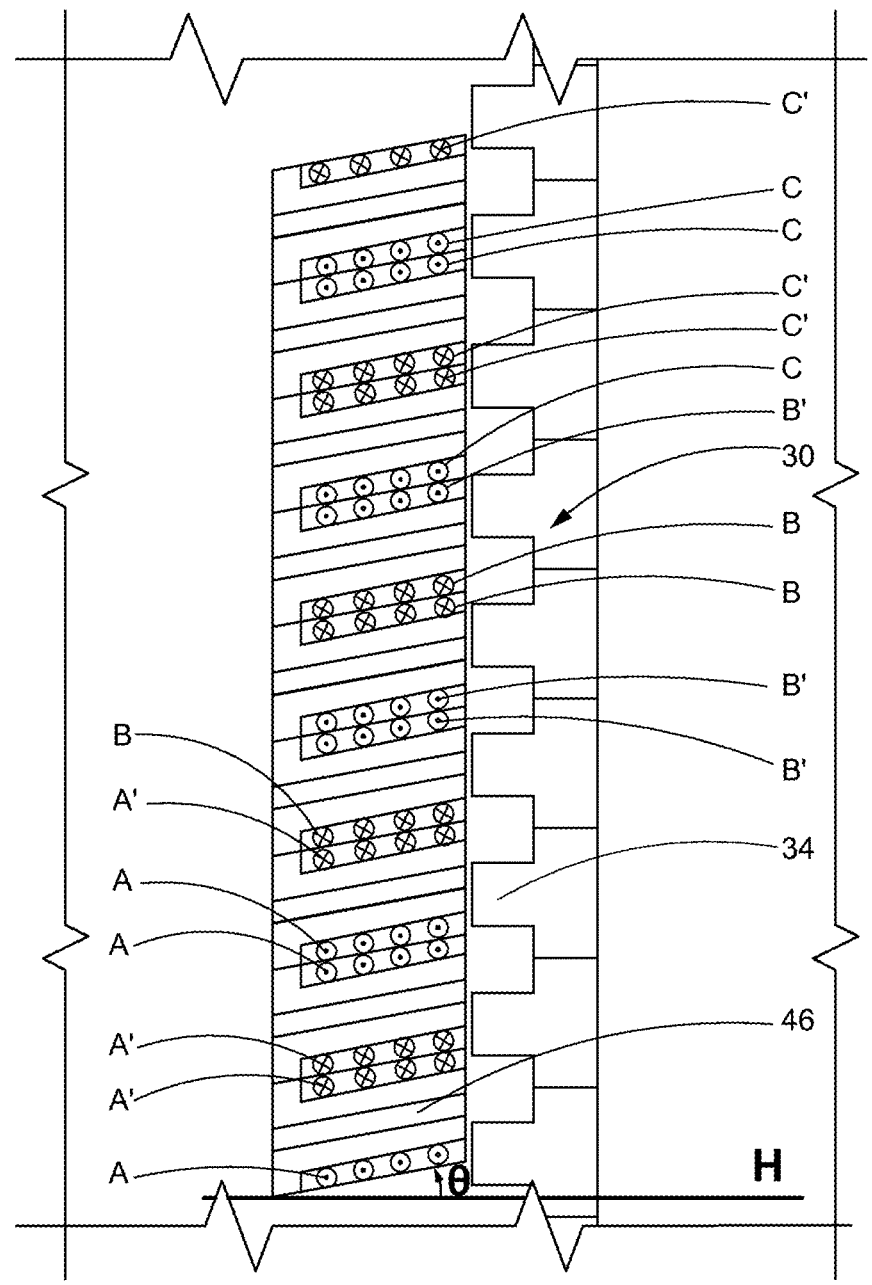
FIG. 12 is a front view of the exemplary linear motor of FIG. 3 with the magnet layers of the mover angled.

FIG. 12 illustrates a variation in which the magnet layers 46 of the mover 32 may be angled. Although shown with regard to the embodiment of FIG. 3, this variation is applicable to each of the aforementioned embodiments in FIGS. 3-4, 6 and 8. The angle for the mover 32 magnet layer 46 is the angle 8 and may be in the range of about −60° to about 60° from the plane H perpendicular to the direction of thrust on the mover 32 generated by the interaction of the mover 32 with the stator 30.

Figure 13:
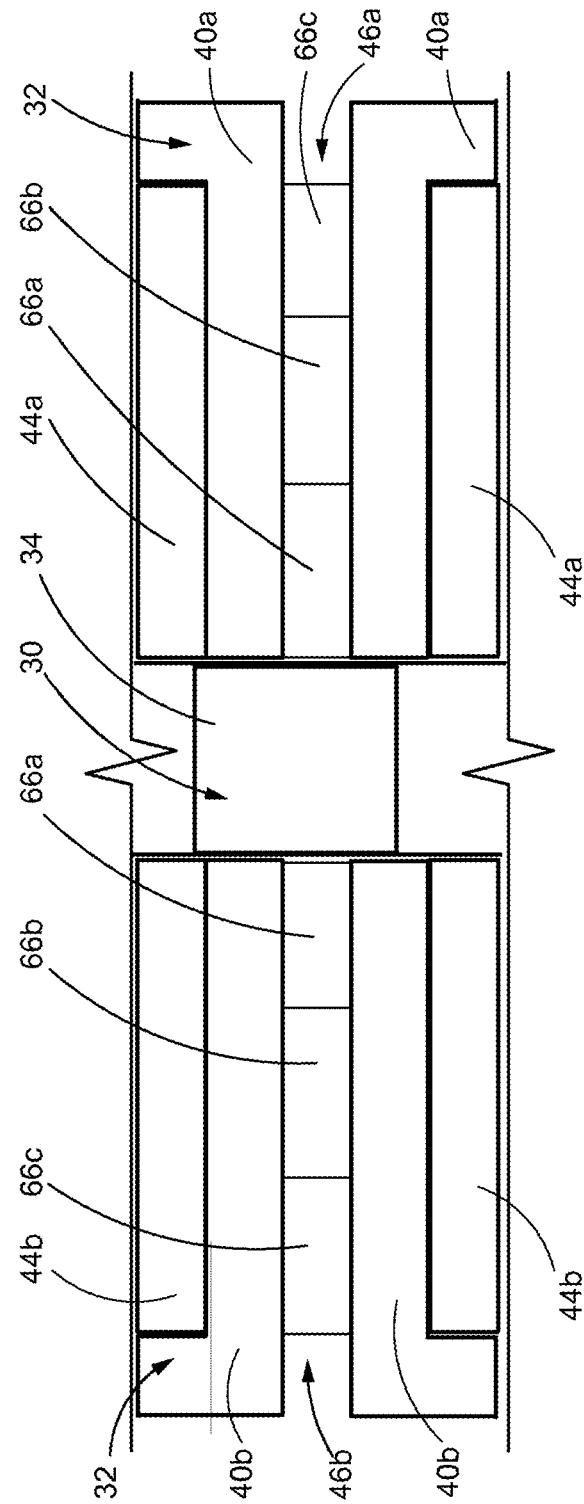
FIG. 13 is an enlarged schematic of an exemplary magnet layer of a mover.

FIG. 13 illustrates in an enlarged schematic a variation of the exemplary magnet layer 46. This variation is applicable to each of the aforementioned embodiments in FIGS. 3-4, 6, 8, 11 and 12 and aids in reducing magnet losses and achieving higher operating efficiencies. In FIG. 13, each magnet layer 46 may be comprised of one or more magnets. In the example shown in FIG. 13 the magnet layer is comprised of three magnets, a first magnet 66a, a second magnet 66b and a third magnet 66c. The magnet 66a disposed closest to the stator teeth 34 may be made of a bonded magnet with high resistivity properties. The second and the third magnets 66b, 66c may be sintered magnets. In another embodiment, each magnet layer 46 may be comprised of a plurality of magnets including a group of sintered magnets and a group of bonded magnets. Each magnet in the sintered group is a sintered magnet, and each magnet in the bonded group is disposed between the sintered group and the stator teeth 34 and is a bonded magnet with high resistivity properties.

Figure 14:
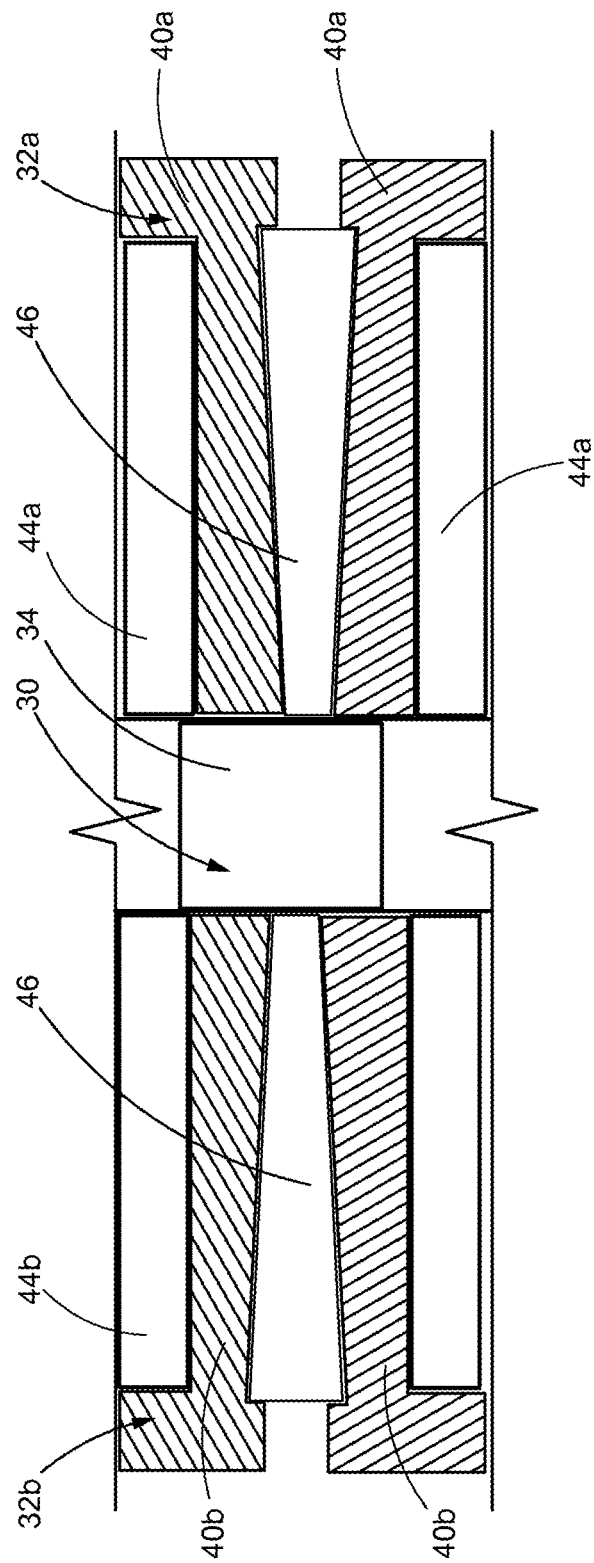
FIG. 14 is a schematic of another exemplary embodiment of a magnet layer.

FIG. 14 illustrates, in an enlarged schematic, a variation of the exemplary stator. This variation is applicable to each of the aforementioned embodiments in FIGS. 3-4, 6, 8, 11, 12 and 13. In FIG. 14, each magnet layer 46 may be trapezoidal shaped. The trapezoidal shape helps reduce magnetic saturation and allows the linear propulsion machine to operate at higher force densities.

Figure 15:
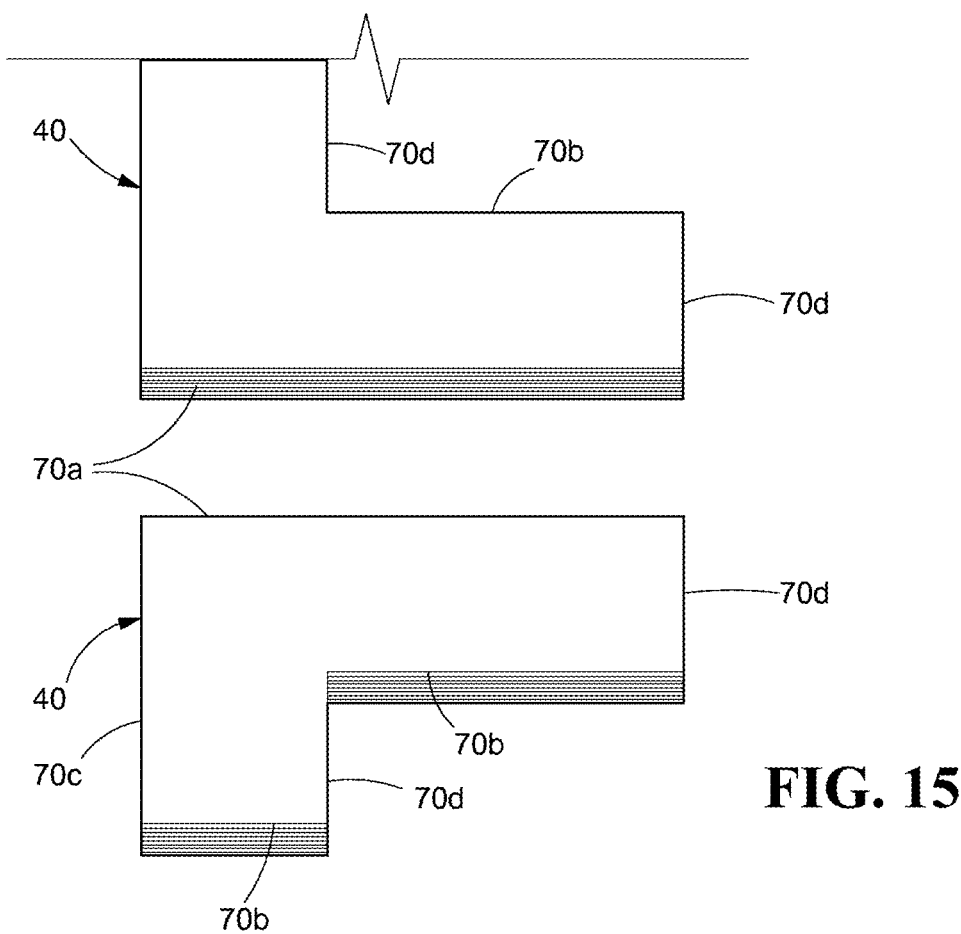
FIG. 15 is a schematic showing an enlarged view of a portion of an exemplary mover.
Figure 16:
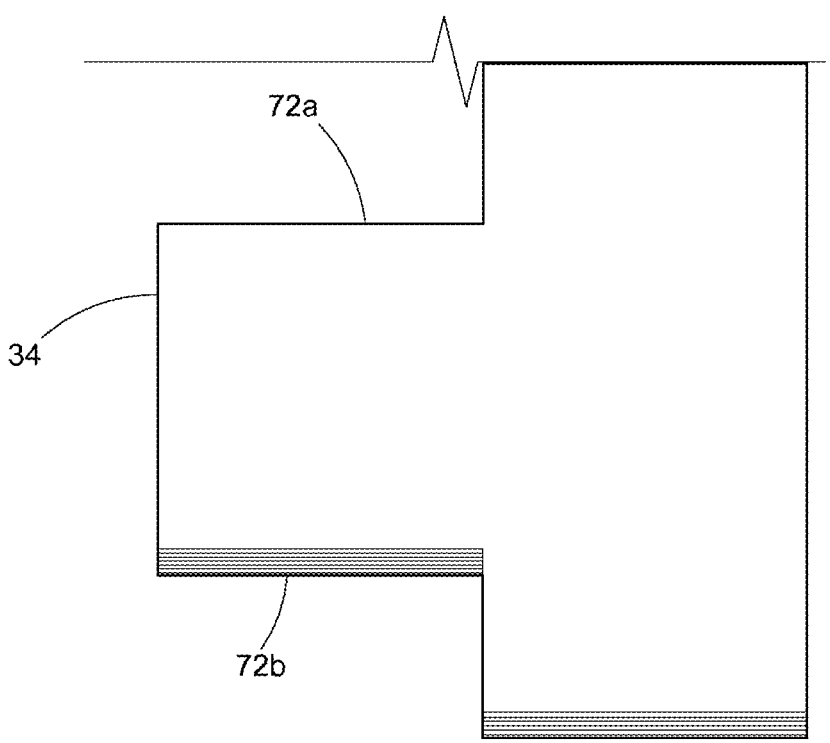
FIG. 16 is a schematic showing an enlarged view of a portion of an exemplary stator and tooth.

FIGS. 15-16 illustrate variations in which a plurality of surfaces 70 of the strata 40 (of the mover 32) and/or a plurality of surfaces 72 of the stator 30 may be skewed. The term "skewed" as used herein means that the applicable surfaces 70, 72 taper from a plane perpendicular to the direction of thrust on the mover 32 generated by the interaction of the mover 32 with the stator 30. The variations illustrated in FIGS. 15-16 may be applicable to each of the aforementioned embodiments in FIGS. 3-4, 6, 8, and 11-14, and with each other.

FIG. 15 is an enlarged view showing a portion of an exemplary mover 32. FIG. 15 illustrates a variation in which one or more surfaces 70 of each of the strata 40 of the mover 32 may be skewed. In FIG. 15, the wire coils 44 and permanent magnet layers 46 have been removed in order to better show the skewing of the strata 40. In the exemplary embodiment of FIG. 15, each strata 40 includes an outer side surface 70a, an inner side surface 70b; a left side surface 70c and right side surfaces 70d; the outer side surface 70a of each strata 40 (that is adjacent to the permanent magnet layer 46) is skewed and the inner side surface 70b (that is adjacent to the wire coils 44) is skewed. In this particular embodiment, left and right sides surfaces 70c, 70d are not skewed. In an embodiment in which the strata 40 are skewed as described above, the permanent magnet layers 46 and wire coils 44 of the mover 32 may also be skewed in order to accommodate the strata 40 geometry.

FIG. 16 is an enlarged view showing a portion of an exemplary stator 30. FIG. 16 illustrates a variation of the stator 30 in which one or more surfaces 72 of the stator may be skewed. In the exemplary embodiment of FIG. 16, each tooth 34 has an upper and lower side surface 72a, 72b. It can be seen that the lower side surface 72b of each tooth 34 is skewed. Although not visible in the illustration, the opposing upper side surface 72a of each tooth is also skewed in this embodiment.

INDUSTRIAL APPLICABILITY

In light of the foregoing, it can be seen that the present disclosure sets forth a linear propulsion system. In one exemplary embodiment the linear propulsion system is an elevator system utilizing one or more linear motors per car. Such elevator systems may be most appropriate for propulsion of non-counterweighted or ropeless elevator cars.

In the embodiments disclosed herein, the stator is free of active elements and is mechanically strong, rigid and simplified. The active elements, the magnetic layers and the coils of wire, are disposed on the mover instead of the stationary stator positioned in the hoistway. Because the magnets and coils of wire do not line the entire stator track, fewer are utilized overall. This results in a more cost efficient system without sacrificing thrust force. In addition, the angling of either the teeth of the stator or the magnet layer results in improved efficiency and skewing results in reduced thrust force ripple.

Furthermore, in embodiments in which a plurality of linear motors are utilized for each car, the linear motors may be so positioned on the car to reduce thrust force ripple.

While only certain embodiments have been set forth, alternatives and modifications will be apparent from the above description to those skilled in the art. These and other alternatives are considered equivalents and within the spirit and scope of this disclosure.

What is claimed is:

1. A linear propulsion machine comprising:
    a first stator, the stator including a plurality of teeth; and
    a first mover adjacent to the first stator and moveable in a linear direction along the first stator, the mover including:
        a plurality of spaced apart ferromagnetic strata;
        a plurality of slots, each of the slots adjacent to at least one of the strata;
        a plurality of wire coils, each coil disposed in at least one slot, the coils having an activated state and a deactivated state; and
        a plurality of magnet layers, each magnet layer sandwiched between two of the strata and disposed inside one of the plurality of coils,
        the mover being arranged along the linear direction in a repeating pattern of coil, strata, magnet layer, strata, coil;
    wherein each coil is disposed substantially perpendicularly to the direction of magnetic flux of the permanent magnet layer around which the coil is wound, wherein the teeth or the permanent magnet layer is disposed at an angle from a plane substantially perpendicular to the direction of thrust on the first mover generated by the interaction of the first mover with the first stator.

2. The linear propulsion machine of claim 1, wherein the plurality of slots is a multiple of a number of phases of the linear propulsion machine.

3. The linear propulsion machine of claim 1, wherein each of the plurality of teeth includes a skewed side surface.

4. The linear propulsion machine of claim 1, in which each of the plurality of teeth has a tooth width and a distance across the slot between two strata is a slot width, wherein the slot width is about the same as the tooth width.

5. The linear propulsion machine of claim 1, wherein each of the strata includes a skewed strata side surface.

6. The linear propulsion machine of claim 1, further including a second stator, wherein the first mover is disposed between the first and second stators.

7. The linear propulsion machine of claim 1, further including a second mover moveable in a linear direction along the first stator, wherein the first stator is disposed between the first and second movers.

8. The linear propulsion machine of claim 7, wherein the magnet layers of each of the first and second movers are angled in relation to the first stator.

9. The linear propulsion machine of claim 7, further including a third and fourth mover moveable in a linear direction along the first stator, wherein the first stator is disposed between the third and forth movers and the third and fourth movers are offset from the first and second movers.

\* \* \* \* \*